US009569966B2

(12) United States Patent
Bobbitt

(10) Patent No.: US 9,569,966 B2
(45) Date of Patent: Feb. 14, 2017

(54) BICYCLE TRACKING SYSTEM WITH COMMUNICATION HUB

(75) Inventor: Mark Anthony Bobbitt, Auckland (NZ)

(73) Assignee: B-Cycle LLC, Waterloo, WI (US)

( * ) Notice: Subject to any disclaimer, the term of this patent is extended or adjusted under 35 U.S.C. 154(b) by 0 days.

(21) Appl. No.: 13/420,271

(22) Filed: Mar. 14, 2012

(65) Prior Publication Data

US 2012/0239248 A1    Sep. 20, 2012

Related U.S. Application Data

(60) Provisional application No. 61/452,474, filed on Mar. 14, 2011.

(51) Int. Cl.
*G06F 7/00* (2006.01)
*G08G 1/127* (2006.01)
*G08G 1/00* (2006.01)

(52) U.S. Cl.
CPC ............. *G08G 1/127* (2013.01); *G08G 1/20* (2013.01)

(58) Field of Classification Search
CPC ...... G01C 21/34; G06Q 10/02; G06Q 30/0631
USPC .............................. 701/36, 1, 22, 433; 705/5
See application file for complete search history.

(56) References Cited

U.S. PATENT DOCUMENTS

| 5,917,407 | A  * | 6/1999  | Squire    | B62H 3/00  |
|           |      |         |           | 194/205    |
| 7,898,439 | B2 * | 3/2011  | Bettez    | B62H 3/00  |
|           |      |         |           | 194/205    |
| 8,473,130 | B2 * | 6/2013  | Brady     | B60L 3/0069|
|           |      |         |           | 180/206.1  |
| 9,157,742 | B1 * | 10/2015 | Fahrner   | G01C 21/00 |
| 2007/0252696 | A1 * | 11/2007 | Belisle | B60R 25/102|
|           |      |         |           | 340/572.1  |
| 2008/0312819 | A1 * | 12/2008 | Banerjee | G01C 21/20 |
|           |      |         |           | 701/433    |
| 2010/0228405 | A1 * | 9/2010 | Morgal    | B62H 3/02  |
|           |      |         |           | 701/2      |
| 2010/0313614 | A1 * | 12/2010 | Rzepecki | B62H 5/145 |
|           |      |         |           | 70/233     |
| 2011/0190029 | A1 * | 8/2011 | Parssinen | H04B 1/0028|
|           |      |         |           | 455/552.1  |
| 2011/0213629 | A1 * | 9/2011 | Clark     | G06Q 10/02 |
|           |      |         |           | 705/5      |
| 2011/0313880 | A1 * | 12/2011 | Paul     | G06Q 30/0631|
|           |      |         |           | 705/26.7   |

(Continued)

*Primary Examiner* — Thomas G Black
*Assistant Examiner* — Wae Louie

(57) ABSTRACT

A bicycle tracking system for a bicycle rental system includes a number of bicycles each including a bicycle computer configured to record and transmit trip data information. The bicycle computer transmits the trip data to at least one communication hub that is part of the rental system. The communication hub is located at a bicycle rental kiosk. The kiosk includes a parking rack for securely storing a number of bicycles and includes a kiosk radio head configured to receive the trip data from the computer. The kiosk further includes a kiosk computer configured to transmit the trip data to a server, which may provide a user of the system with the trip data in the form of a route map. The system is configured to aggregate the user's trip data from ride-to-ride to provide the user with his or her ride statistics.

19 Claims, 11 Drawing Sheets

(56) References Cited

U.S. PATENT DOCUMENTS

| | | | | |
|---|---|---|---|---|
| 2012/0239248 A1* | 9/2012 | Bobbitt | ................... | G08G 1/20 |
| | | | | 701/36 |
| 2012/0330696 A1* | 12/2012 | Clark | ................... | G06Q 10/02 |
| | | | | 705/5 |
| 2013/0081892 A1* | 4/2013 | Kronfeld | ................... | B60L 7/12 |
| | | | | 180/210 |
| 2013/0325521 A1* | 12/2013 | Jameel | ................... | G06Q 10/02 |
| | | | | 705/5 |
| 2014/0265237 A1* | 9/2014 | Strother | ................... | B62H 5/00 |
| | | | | 280/297 |

* cited by examiner

BICYCLE TRACKING SYSTEM WITH COMMUNICATION HUB

CROSS-REFERENCE TO RELATED APPLICATIONS

This application claims priority on U.S. Provisional Patent Application Serial No. 61/452,474 filed on Mar. 14, 2011 and entitled Bicycle Tracking System with Communication Hub, the entirety of which is hereby incorporated by reference.

BACKGROUND OF THE INVENTION

The present invention relates generally to bicycles and, in particular, to bicycle rental systems and, more particularly, to a bicycle tracking and communication system for a bicycle rental system.

Automated bicycle rental systems have become increasingly popular. Such rental systems typically include a number of rental stations located across a city or other location. The rental stations typically include one or more bicycle stands or racks for supporting a number of rentable bicycles. The bicycles are secured to the bicycle stands by a locking mechanism such that the bicycles are incapable of being removed until payment or identification for the rental of one of the bicycles is recognized.

The bicycle stands are typically in electronic communication with a rental kiosk or the like. Users of the rental system use the rental kiosk or other means to provide payment and/or identification information for renting one of the bicycles for temporary use. Once the electronic means of the kiosk verifies the payment and/or identification, the kiosk enables the user the remove one of the bicycles secured to the bicycle stand by unlocking the locking mechanism. Thus, the user is free to take the bicycle and ride it from place to place. When the user is finished riding the bicycle, he or she returns the bicycle to one of the bicycle stations and secures the bicycle to the bicycle stand for subsequent use by another user.

Known bicycle rental systems suffer from a number of disadvantages. For example, bicycles may be removed from one location and returned to a different location. Thus, a given location may be depleted of bicycles while another kiosk may be filled to capacity when a user returns a bicycle. In either case, the user is inconvenienced by either not being able to rent a bicycle or not being able to return a bicycle to a given location.

Furthermore, certain bicycles may be used more or less often for a variety of reasons resulting in uneven wear and tear across a fleet of bicycles. In addition, bicycles may be disabled, out of service for a number of reasons such as maintenance, vandalized, stolen, or otherwise not returned to a location. Further, bicycles may be used beyond a predetermined usage area, time limit, or distance limit.

Therefore, there is a need to provide a bicycle rental system having a tracking system and communication hub that is configured to overcome at least one of the foregoing disadvantages

BRIEF DESCRIPTION OF THE INVENTION

A bicycle tracking system and communication hub according to the invention includes one or more bicycles and one or more communication hubs or kiosks configured to operably communicate with the one or more bicycles. In particular, the bicycle tracking system includes a number of bicycles associated with one or more kiosks located over a predetermined area such as a city or other such location. Moreover, the bicycle tracking system may include a number of kiosks located at various locations across the predetermined area and which may be in operable communication with one another such that data may be transferred between the bicycles and any one of the kiosks. In this manner, a user may rent a bicycle at a first kiosk and return the bicycle at a second, different kiosk and still maintain the trip data associated with his or her use of the bicycle.

The bicycles include a bicycle computer or similar element for recording data associated with the riding and the usage of the bicycles. The bicycle computers may include a global positioning satellite (GPS) device coupled to the bicycles or otherwise carried by the bicycles to record trip data such as, for example, longitude, latitude, speed, location, distance traveled, and the like. The GPS device may be configured to record the information during the course of the ride and store it in the bicycle computer memory. At the completion of a user's ride, the GPS device may be configured to transmit either wirelessly or through a wired connection the trip data to the kiosk. The GPS data may additionally be used by the tracking system for locating bicycles that have not been returned or which may have been removed without authorization. The bicycles may additionally include an identification element such as an RFID tag located on or in the bicycle or otherwise carried by the bicycle for uniquely identifying each of the bicycles of the tracking system.

The kiosk may be in the form of a bicycle station kiosk. The kiosk may be in operable electronic communication with a parking rack configured to securely hold the bicycles. The parking rack may include one or more parking spaces including support means for securing the bicycle to the parking spaces. The kiosk includes a kiosk computer, which is configured to receive the GPS data from the bicycle computer. The kiosk computer may include a transmitter for transmitting the GPS data from a give user's ride to an enterprise server or other such centralized server. The enterprise server is configured to associate the data received from the kiosk computer with the particular user's profile. Moreover, the enterprise server may be configured to aggregate the user's trip data with previously collected trip data. Further, the enterprise server may be configured to display to the user and/or operators of the bicycle tracking system ride map data, which may then be transmitted to the user in a predetermined manner via a network connection such as via the Internet. The user may use the ride map data to track his or her ride performance or characteristics and may share the data via social networking tools like, for example, Facebook®, Twitter®, or over e-mail. Understandably, the ride map data may also be transportable via a portable storage device such as a USB drive or the like so that the user may take his or her data from place to place. The kiosk and more particularly, the parking racks may include communication means for communicating with the identification element of the individual bicycles. In this way, the parking rack may determine when a given bicycle has been removed from or returned to the parking rack to thereby track whether the bicycle is available for renting.

In this way, the bicycle tracking system of the invention may be used to graphically illustrate overall system metrics and provide operators of the bicycle tracking system with information related to the usage of the bicycles and the kiosks. In this manner, the operators of the bicycle tracking system may be able to determine when a given bicycle is in need of repair or periodic maintenance and whether a particular kiosk location needs more or less infrastructure. For example, the bicycle tracking system may assist operators in determining the best locations for locating the kiosks in a given area so that the system is used in a preferred manner.

These and various other features and advantages of the present invention will be made apparent from the following detailed description and the drawings.

DETAILED DESCRIPTION OF THE PREFERRED EMBODIMENT

Figure 1:
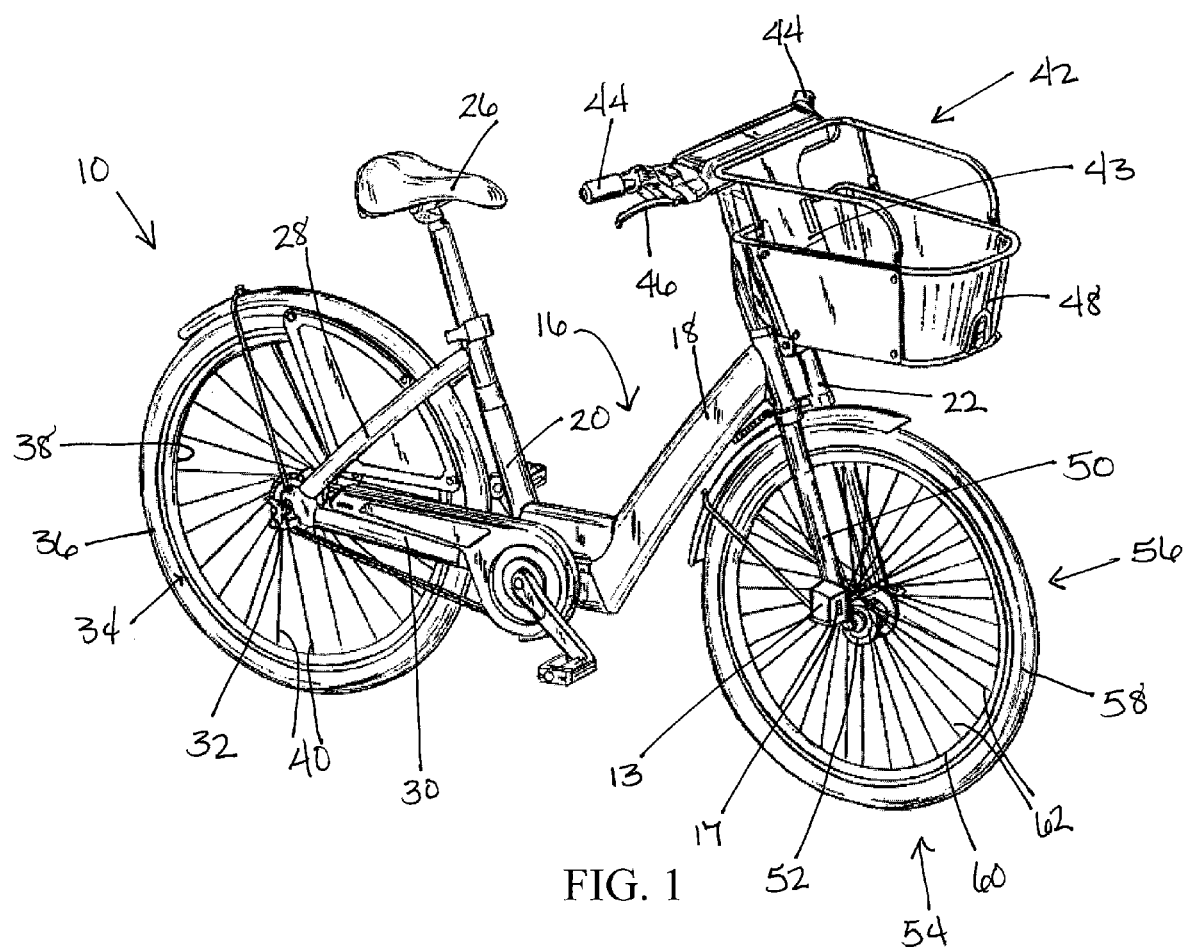
FIG. 1 is an isometric view of bicycle of a bicycle tracking system having a bicycle computer according to the present invention.
Figure 2:
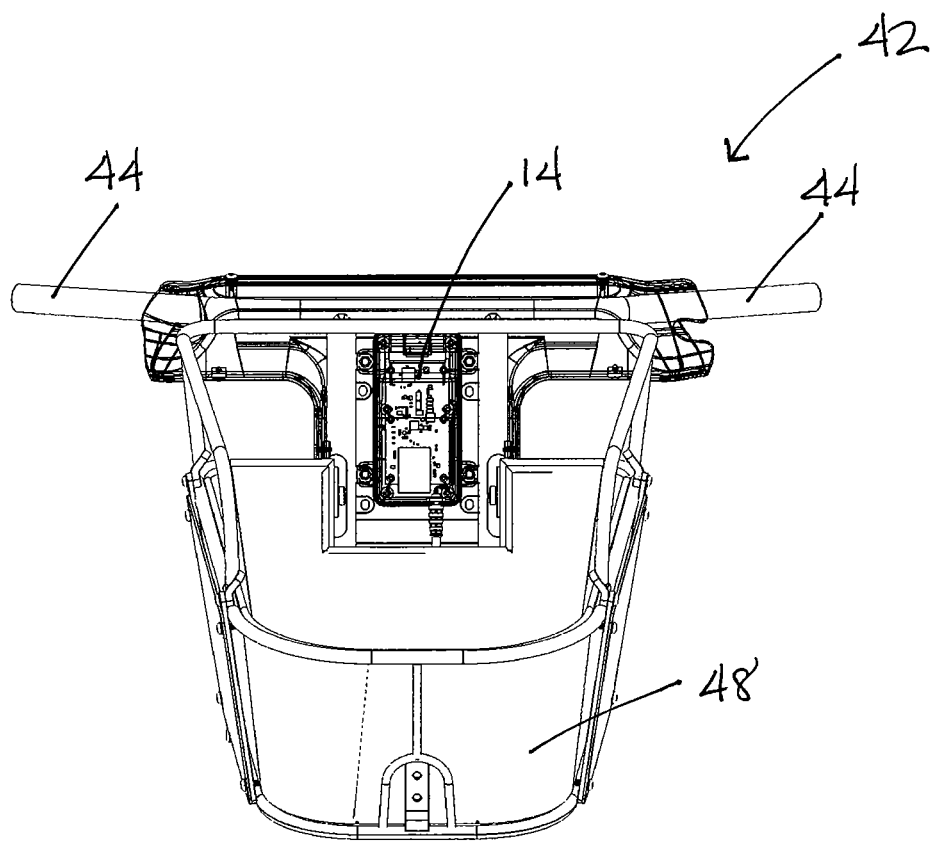
FIG. 2 is a partial front elevation view of the bicycle of the invention showing the bicycle computer mounted in a handlebar assembly of the bicycle.
Figure 3:
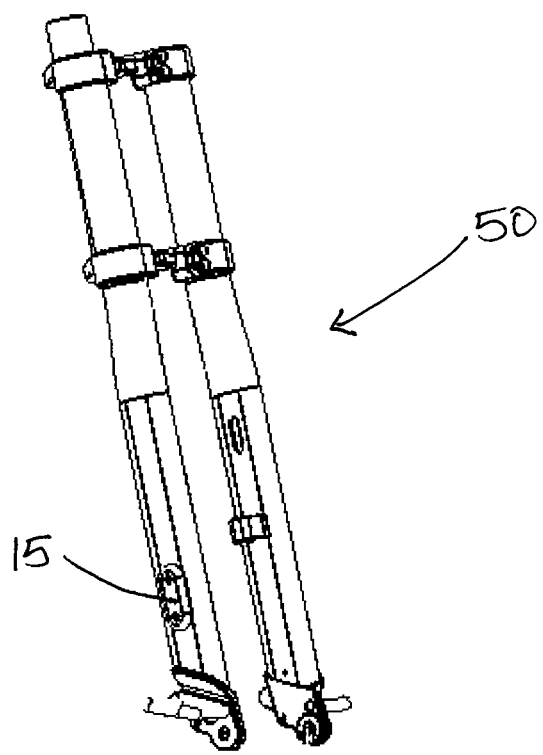
FIG. 3 is a partial isometric view of the bicycle of the invention showing a front fork assembly and an identification element mounted to the front fork assembly.

Referring now to the drawings and initially FIGS. 1-3, a bicycle 10 of a bicycle tracking system 12 (FIG. 8) according to the invention includes a bicycle computer 14 mounted on, coupled to, or otherwise carried by the bicycle 10. The bicycle further includes a unique identification element 15, which may be coupled to or otherwise carried by or in the bicycle 10. The identification element 15 may be in the form of an RFID chip or similar element configured to provide the bicycle 10 with a unique identifier for tracking by the tracking system 12. In a preferred embodiment, the identification element 15 is a RFID chip disposed in the fork of the bicycle 10.

The bicycle 10 according to the invention may further include a power generating hub assembly 13 shown schematically coupled to the front hub of the bicycle 10 for transmitting power to the bicycle computer 14 during riding for charging a battery of the bicycle computer during use. While the power generating hub assembly 13 is shown as being coupled to an outboard portion of the bicycle hub, it is understood that it may be incorporated into the hub assembly and integrated therein in its entirety.

In particular, the hub assembly 13 may be a standard pedal-operated power generator of the kind generally known in the art such as an AC dynamo. The hub assembly 13 may be operably coupled with the bicycle computer 14 for selectively providing power thereto as is generally understood in the art. In this manner, a battery 130 (See FIG. 6) may be automatically charged during use using user-driven power generation. The hub assembly 13 may include a connector 17 for coupling with a corresponding connector (not shown) at a kiosk 64 (see FIG. 4) for interaction therebetween to, for example, charge the battery 130 at the kiosk 64. Moreover, the hub assembly 13 may be configured to power additional components of the bicycle 10 such as a headlamp or other lighting assembly (not shown).

The bicycle 10 includes a frame 16 having a down tube 18 interconnected between a seat tube 20 and a head tube 22. A seat post 24 is telescopically secured within the seat tube 20 and has a seat 26 for supporting a rider supported at an upward end thereof. The seat post 24 is selectively adjustable to accommodate different heights of users of the bicycle 10. Although only down tube 18 laterally connects head tube 22 and seat tube 20, other bicycle frame configurations are envisioned such as those that may include a separate top tube extending between the head tube and the seat tube. As used herein, the term frame or bicycle frame is intended to encompass all such variations. A pair of seat stays 28 and chain stays 30 extend rearwardly from seat tube 20 and support a rear hub assembly 32 of bicycle 10. Chain stays 30 extend generally parallel to a chain (not shown) of the bicycle 10 and connect to the rear dropouts. A rear hub assembly 32 rotatably supports a rear wheel 34. Rear wheel 34 comprises a tire 36 secured to a rim 38. Rim 38 includes a plurality of spokes 40 interconnected with the rear hub assembly 32 for supporting the tire 36 of the wheel 34.

Referring to the forward end of bicycle 10, head tubes 22 support a handlebar assembly 42. Handlebar assembly 42 includes handlebars 44 for steering bicycle 10. Handlebar assembly 42 further includes handbrakes 46 which are operably coupled to brake assemblies (not shown) associated with one or both of the front and rear wheel assemblies. Bicycle 10 includes an optional storage container 48 that is coupled to handlebar assembly 42 and head tube 22. Storage container 48 is adapted for storing or otherwise securing items while a user is operating the bicycle.

Head tube 22 may be constructed as a pair of supports configured for supporting a bottom portion of storage container 48, or alternatively, head tube 22 may comprise a single tube like those generally known in the art. A pair of forks 50 extends downwardly relative to head tube 22 and is coupled to a front hub assembly 52 of the front wheel assembly 54.

The hub assembly 52 rotatably supports front wheel 56. Front wheel 56 includes a tire 58 that is supported on a rim 60. Rim 60 includes a plurality of spokes 62 that extend radially between rim 60 and the front hub assembly 52. Understandably, bicycle 10 of the present invention may comprise a number of different configurations in keeping with the spirit of the present invention. That is, bicycle 10 may comprise alternative frame, wheel, support and/or suspension features and structures.

Referring now to FIG. 2 in particular, the bicycle computer 14 is shown mounted in the handlebar assembly 42. In particular, the bicycle computer 14 is housed within a compartment formed in the handlebar assembly 42. The handlebar assembly 42 includes a cover 43 over the compartment housing the bicycle computer 14. The cover 43 may be configured to be selectively accessed by an operator of the tracking system 12 for maintenance or the like. Preferably, the cover 43 is configured to prevent unauthorized access to the bicycle computer 14 such that the bicycle computer 14 is protected from theft and vandalizing. Moreover, the cover 43 protects the bicycle computer 14 from damage from the elements, e.g., rain, snow, debris, etc.

Figure 4:
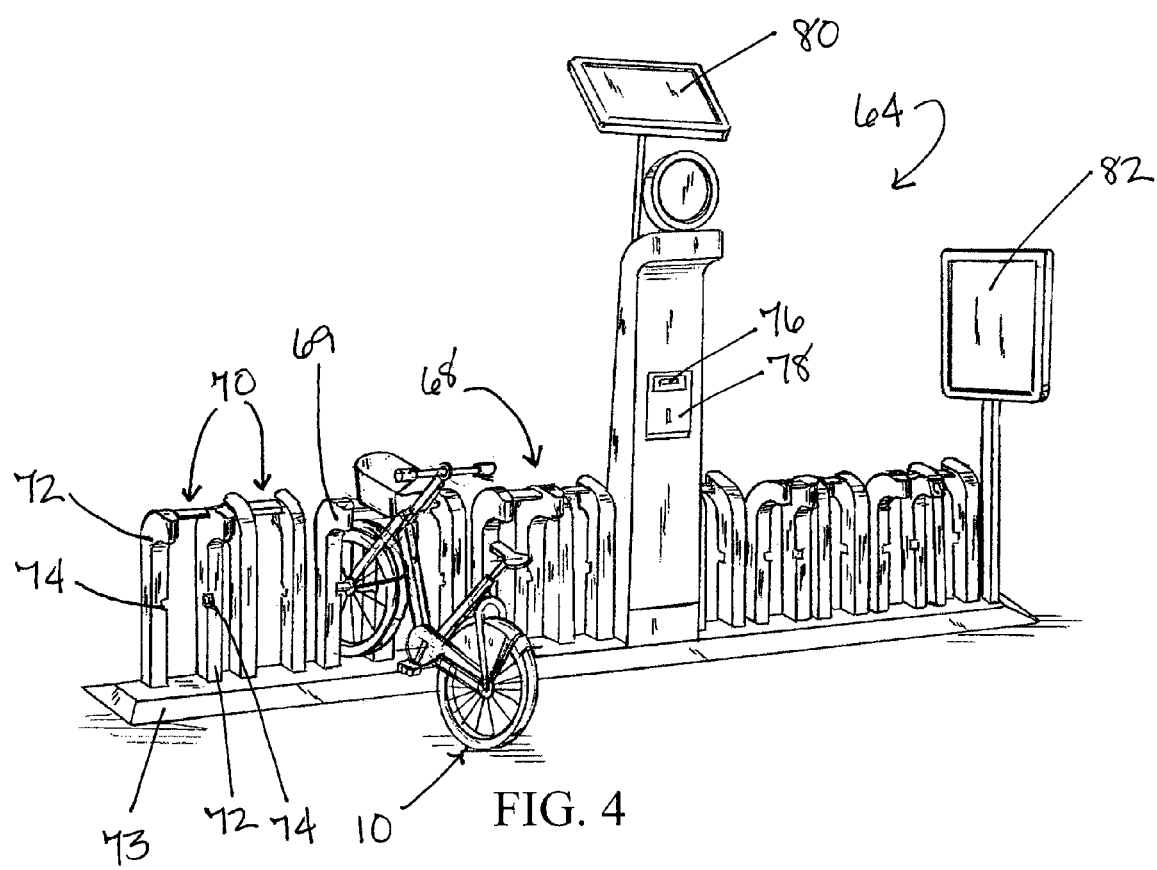
FIG. 4 is an isometric view of a bicycle rental kiosk and parking rack.

Referring now to FIG. 4, a bicycle rental kiosk 64 having a kiosk computer 66 (FIG. 8) is shown. The kiosk 64 is in operable communication with a bicycle parking rack 68, which includes a number of parking spaces 70 for securely receiving a number of bicycles 10 associated with the tracking system 12. Each of the parking spaces 70 is defined by one or more support members 72 supported on a platform 73 and including a locking arrangement 74 for securely engaging a corresponding locking element (not shown) of the bicycle 10. The locking arrangement 74 may be in operable communication with the kiosk 64 and the kiosk computer 66. In this way, the kiosk 64 may be configured to selectively release the locking arrangement 74 to enable a user to remove a bicycle for renting after receipt of payment or identification means at the kiosk or another location remote from the kiosk 64.

The kiosk 64 may include a display element 76 and a user authorization element 78. The user authorization element 78 may be configured to receive payment in the form of bills, coins, and credit or debit cards from a user wishing to rent one of the bicycles 10. The user authorization element 78 may further be configured to receive other identification means from a user. For instance, a user may be supplied with a membership card, token, fob, or other such element that is configured to operably interact with the user authorization element 78 so that the when the user wishes to rent a bicycle 10 at a given kiosk, he or she may simply supply the user authorization element 78 with the necessary authorizing information about the user so that the user may then rent a bicycle 10 from the kiosk 64. In this manner, users who wish to rent bicycles 10 on a regular basis may sign up either at the kiosk 64 or at another location remote from the kiosk such as over the Internet for receipt of a membership card or the like, which may be used to periodically rent bicycles 10 from the system 12. In this way, the user need not supply his or her payment information each and every time he or she wishes to rent a bicycle 10; instead, payment may be made automatically open interaction between the identification element, e.g., membership card, and the kiosk 64 or the identification element may be preloaded with a number of credits for rental or any other such type configurations.

The display element 76 of the kiosk 64 may be configured to display information to the user concerning his or her rental of the bicycle 10 as may be desired. For example, the display element 76 may communicate to the user so as to instruct the user on how to complete the rental process etc. Moreover, the display element 76 may be configured to communicate any other such information to the user as may be deemed necessary including weather conditions, bicycle paths in the vicinity, road closures, etc. The kiosk 64 may include a power supply element 80 such as a solar panel, which may be configured to supply a power source (not shown) such as a battery with power and may be configured to periodically charge the power source as necessary. The kiosk 64 may also include an information display element 82, which may be in the form of standard sign or other display, which may be configured to convey information and instructions to users. In addition, the display element 82 may provide a map of the area and identify where the user currently is and where he or she may find other kiosks 66 on the system. The display element 82 may also convey suggested routes or other information to the user.

One or both of the kiosk 64 and the parking rack 68 may include one or more bicycle identification readers 69 configured to operably interact with the identification element 15 of the bicycle 10. In particular, the identification reader 69 may be configured to transmit a signal in the direction of a bicycle 10 when it is docked or undocked from the parking rack 68 to identify the bicycle 10 that is being returned or removed from the parking rack 68. The reader 69 then receives a communication received from the identification element 15 in the bicycle 10 and electronically transmits the information to the kiosk 64 for relay to an enterprise server 90 (see FIG. 6) as will be discussed in additional detail herein. In a preferred embodiment, the identification reader 69 is an RFID reader of the kind generally known in the art.

Figure 5:
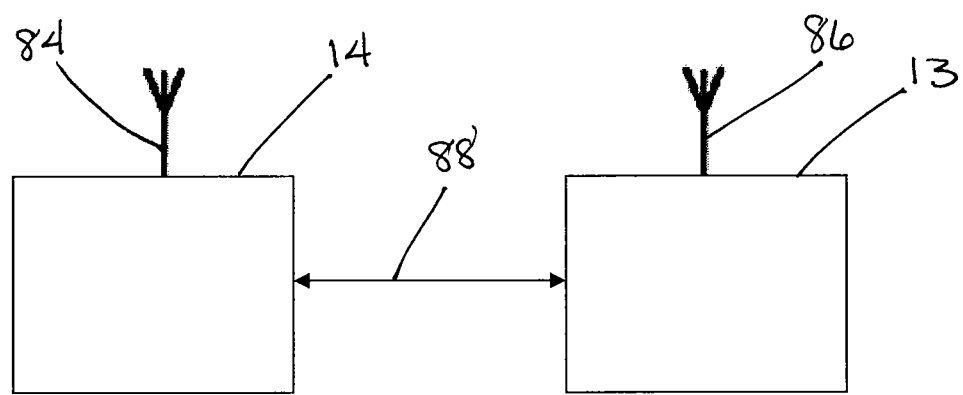
FIG. 5 is a block diagram of the bicycle computer and a power generating hub assembly.

Turning now to FIG. 5, a schematic representation of the bicycle computer 14 in operable communication the power generating hub 13. In particular, as illustrated, the bicycle computer 14 includes a wireless communication element 84, which is shown as an antenna. In a preferred construction, the bicycle communication element 84 is in the form of an RF transmitter. The bicycle communication element 84 may be configured for unidirectional or bidirectional wireless communication with the hub assembly 13. The hub assembly 13 also includes a communication element 86, again shown as an antenna, which again may be in the form of a RF transmitter. In the alternative or in addition to, the bicycle computer 14 and the hub assembly 13 may be configured to communicate over one or more wired connections 88.

Figure 6:
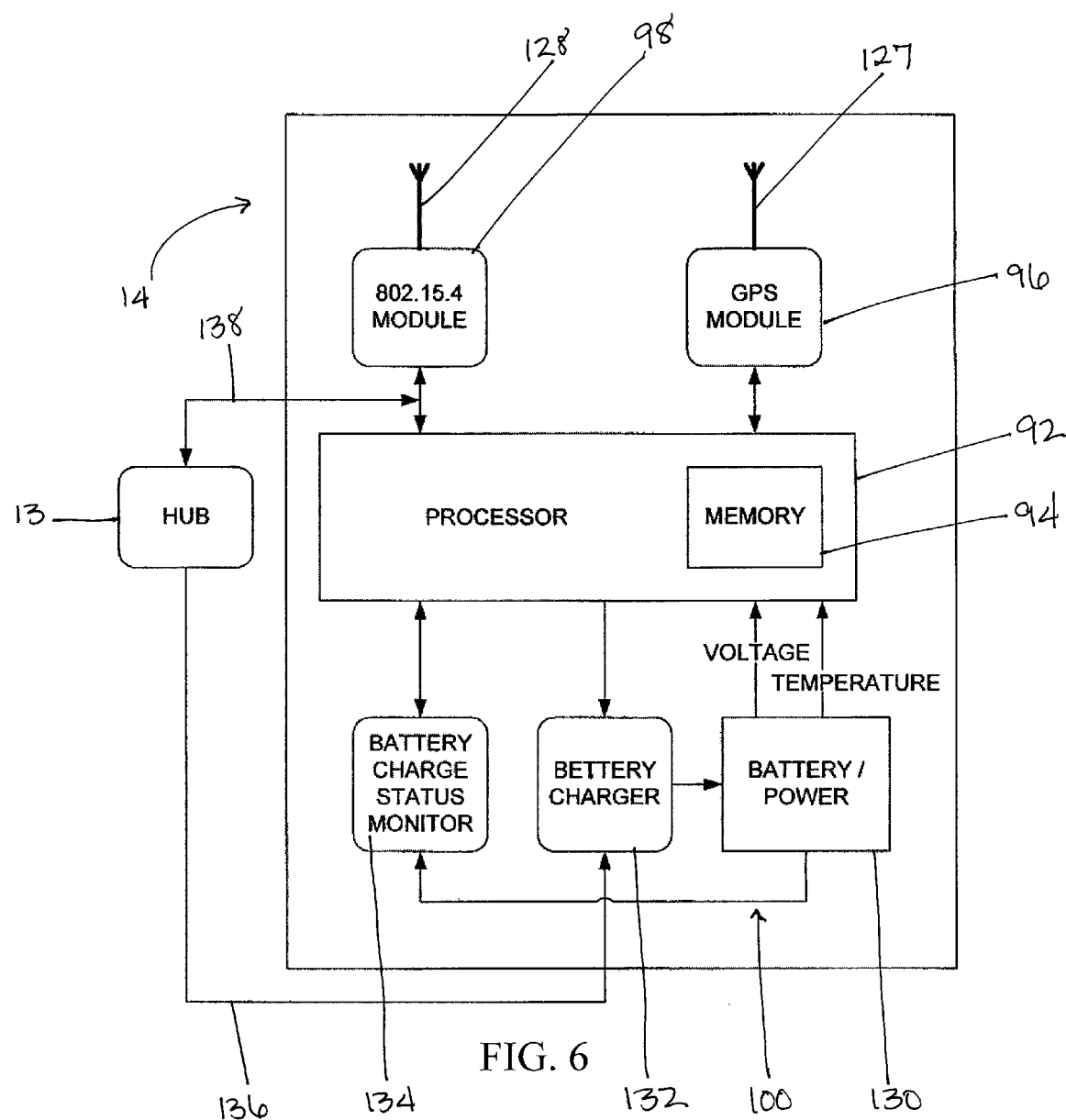
FIG. 6 is block diagram of the bicycle tracking computer of the present invention.

Referring now to FIG. 6 a detailed schematic view of the bicycle computer 14 is provided. The bicycle computer 14 includes a processor 92 having a memory element 94, either internal or external that is inoperable communication with a GPS module 96, communication module 98, and power module 100. In an alternative construction of the bicycle computer 14, GPS and RF chipsets may be provided on a single printed circuit board. The memory element 94 may be non-volatile memory such that in the case of total battery loss, the stored route data at the bicycle computer 14 will be preserved.

In an alternative construction of the bicycle computer 14, the bicycle 10 may include an alternative arrangement for obtaining the bicycle's relative position and for tracking the route traveled thereby. In particular, the bicycle 10 may be outfitted with a gyroscope, electronic compass or similar element (not shown) that may be used to calculate the bicycle position by estimating the direction and distance traveled, e.g., dead reckoning. The gyroscope, compass, or other element may be in electronic communication with the bicycle computer 14 via a power generating hub (not shown) or similar arrangement. The data obtained from the gyroscope, compass, or other element may be utilized exclusively or in combination with the GPS module 96 so that when the bicycle 10 is operating in areas with poor or no satellite reception, the bicycle computer 14 may still track the route.

Figure 7:
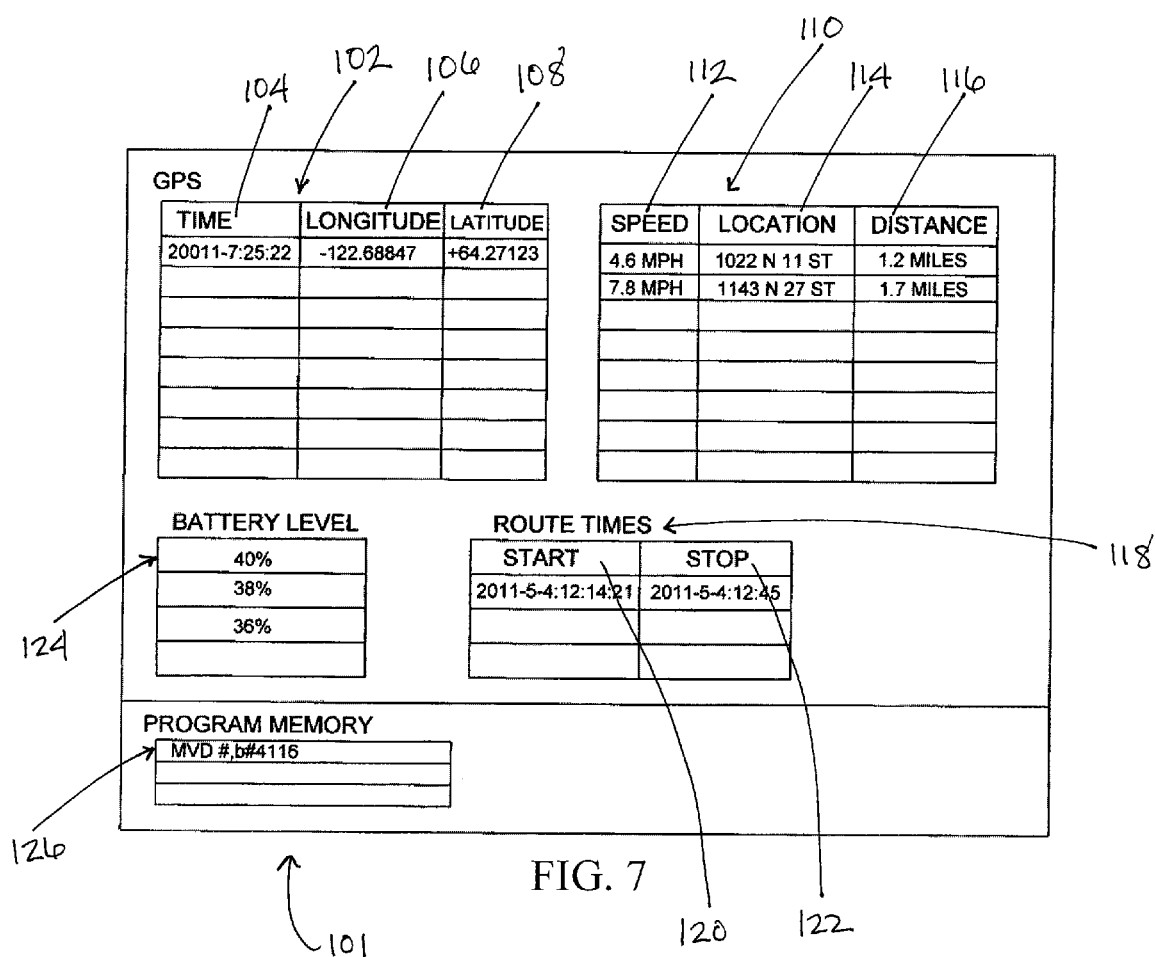
FIG. 7 is block view of a memory of the bicycle tracking computer and a number of exemplary parameters stored therein.

With additional reference now to FIG. 7, the bicycle computer 14 is configured to log trip data 101 such as GPS data 102 by way of the GPS module 96 or GPS chipset at predetermined intervals. In one construction of the invention, the GPS position is logged every 30 seconds. In another construction of the invention, the GPS position may be dynamically logged relative to a speed of travel of the bicycle 10. With respect to the position data 102, each logged data point may include a timestamp 104, longitude reading 106, and latitude reading 108. Moreover, using the GPS position data 102, the bicycle computer 14 may be configured to derive and usage data 110 including speed 112, location 114, distance traveled 116, and route time data 118 including start times 120 and stop times 122. This may be done subsequently and remotely from the bicycle computer 14. Understandably, the parameters listed here are merely exemplary and any number of other parameters as may be desired may be logged as trip data 101. The GPS module 96 may include an antenna 127 for receiving GPS signals.

The bicycle computer 14 may additionally monitor and provide a battery level indication 124 and may provide a program memory 126 for performing software updates to the bicycle computer 14 via a wired interface.

Now referring back to FIG. 6, the communication module 98 may be an RF module such as an 802.1 5.4 module or similar such module known in the art and include an RF antenna 128 for wirelessly communicating with the kiosk 64 as will be described herein. The hub may be operably coupled with the communication module 98 by a wired connection 138 for communication therebetween.

Still referring to FIG. 6, the power module 100 includes a battery 130, battery charger 132, and battery charge status monitor 134. The battery charge status monitor 134 is configured to monitor the battery level to provide the battery level indication 124. In a preferred embodiment, the power module 100 is configured to self-charge the bicycle computer 14 and more particularly to self-charge the GPS module 96. In particular, when the battery charge status monitor 134 indicates that the battery level indication 124 is below a predetermined threshold, the bicycle computer 14 is configured to automatically charge the battery 130 via the battery charger 132. In particular, the battery charger 132 is operably coupled with the kiosk 64 via a wired connection 136 and the kiosk includes means for providing power to the charger 132 for charging the battery 130. In this manner, the bicycle computer 14 is ensured of having sufficient power to continually log GPS data in accordance with the invention.

The charge status monitor 134, in addition to monitoring the power consumption of the battery 130 of the bicycle computer 14, may additionally monitor the power available from the power generating hub assembly 13, which may vary upon the bicycle speed. As the bicycle moves faster, more power will become available from the power generating hub assembly 13. This can be used to charge the battery at a faster rate and also turn on additional features at the bicycle computer 12. For example, the additional features may include fast bicycle position tracking, heater for battery warming, fast charging of the battery. If the battery 130 is depleted then the bicycle computer 14 may turn off features to save battery life. For example, the bicycle computer 14 may turn off GPS position tracking and radio communications. The battery charging may be disabled if the battery temperature is outside the recommended battery charging temperature range. When the battery 130 is too cold, a battery heater may be enabled to warm the battery 130 above its minimum threshold.

The bicycle computer 14 may additionally include an accelerometer, gyroscope, three-axis compass, or similar arrangement that can be used to detect a collision of fall, which may then be used by service personnel of the bicycle tracking system 12 to respond to the bicycle 10 and assist the user.

Figure 8:
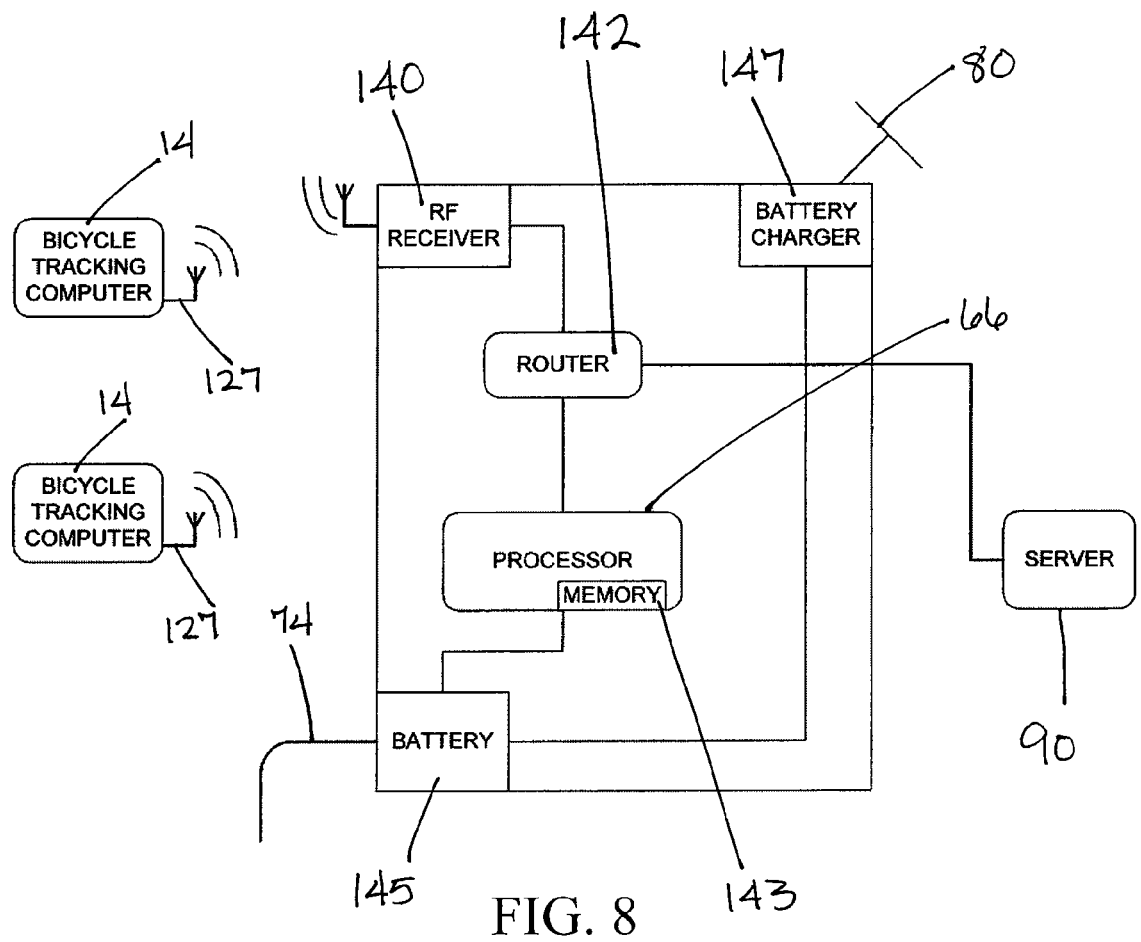
FIG. 8 is block diagram of an embodiment of the kiosk of the present invention showing communications with the bicycle tracking computers and the remote server.

Turning now to FIG. 8, a detailed schematic illustration of the bicycle rental kiosk 64 of the kiosk 64 is provided. The bicycle rental kiosk 64 includes a kiosk radio head 140 that is configured to wirelessly communicate with the bicycle computers 14 via the corresponding communication module 98 thereof. In this manner, the kiosk radio head 140 is configured to receive trip data of the bicycles 10 from the bicycle computers 14. Once the kiosk radio head 140 receives trip data from the bicycle computer 14, the kiosk radio head transmits the trip data to the enterprise server 90 via a router 142. The bicycle rental kiosk 64 further includes the kiosk computer 66 that is configured to control the checking in and out of the bicycles 10 from the parking rack 68. The kiosk computer 66 is configured to transmit a signal via the router 142 whenever a bicycle 10 is removed or returned to a parking rack 68 that is part of the system 12. As previously discussed, the kiosk computer 66 is configured to identify the particular bicycle 10 that has been checked in or out by way of the interaction between the identification element 15 and the identification reader 69.

Communication between the communication module 98 and the kiosk radio hub 140 may be carried out over any number of known transmission protocols including ZigBee (2.4 GHz, IEEE 802.15.4 wireless communication), Bluetooth (IEEE 802.15.1), general packet radio source (GPRS), such as, 2 G, 3 G, or 4 G, Bluetooth Low Power (BLP or BLE), mesh network (IEEE 802.15.5), wireless Ethernet, or any other such industry standard or custom protocol configured for short-range wireless communication.

Figure 9:
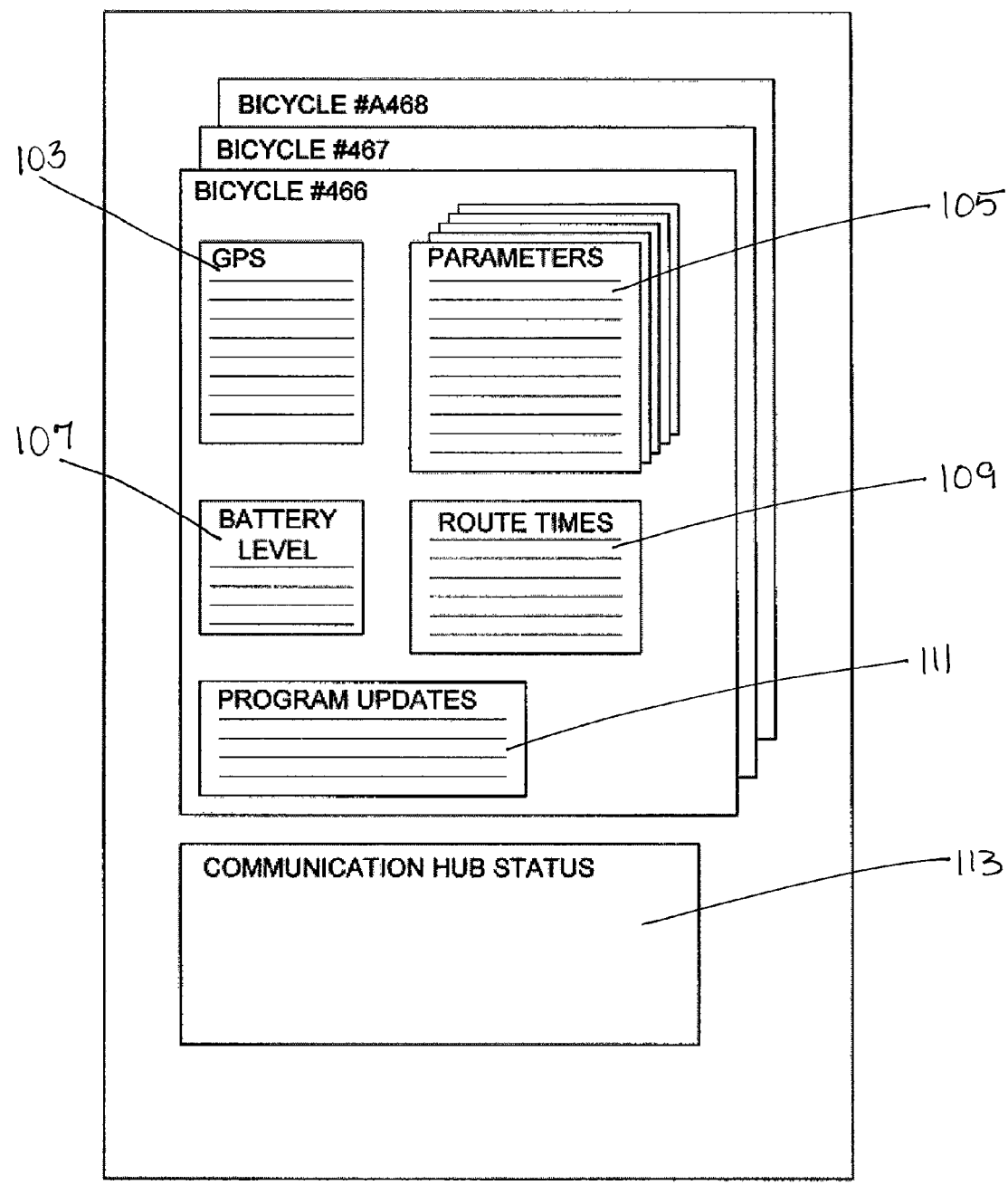
FIG. 9 is block view of the memory of the kiosk and exemplary parameters and data records stored therein.

Referring momentarily to FIGS. 8 and 9, the kiosk computer 66 may include a memory unit 143, which may be either internal or external and may further include Ethernet and USB connections. The memory unit 143 of the kiosk computer may be configured to store the trip data 101 received from the bicycle computers 14. The trip data 101 may associate each of the bicycles 10 of the system 12 with its given trip data including GPS data 103, parameters derived from the GPS data 105, battery level 107, route times 109, program update data 111, and communication hub status information 113.

Referring now to FIG. 8, the kiosk computer 66 may include a battery 145 coupled to a battery charger 147, which may be in communication with the power supply element 80, e.g., solar panel. In this manner, the power supply element 80 may charge the battery 145 for continued operation of the kiosk computer 66.

Figure 11:
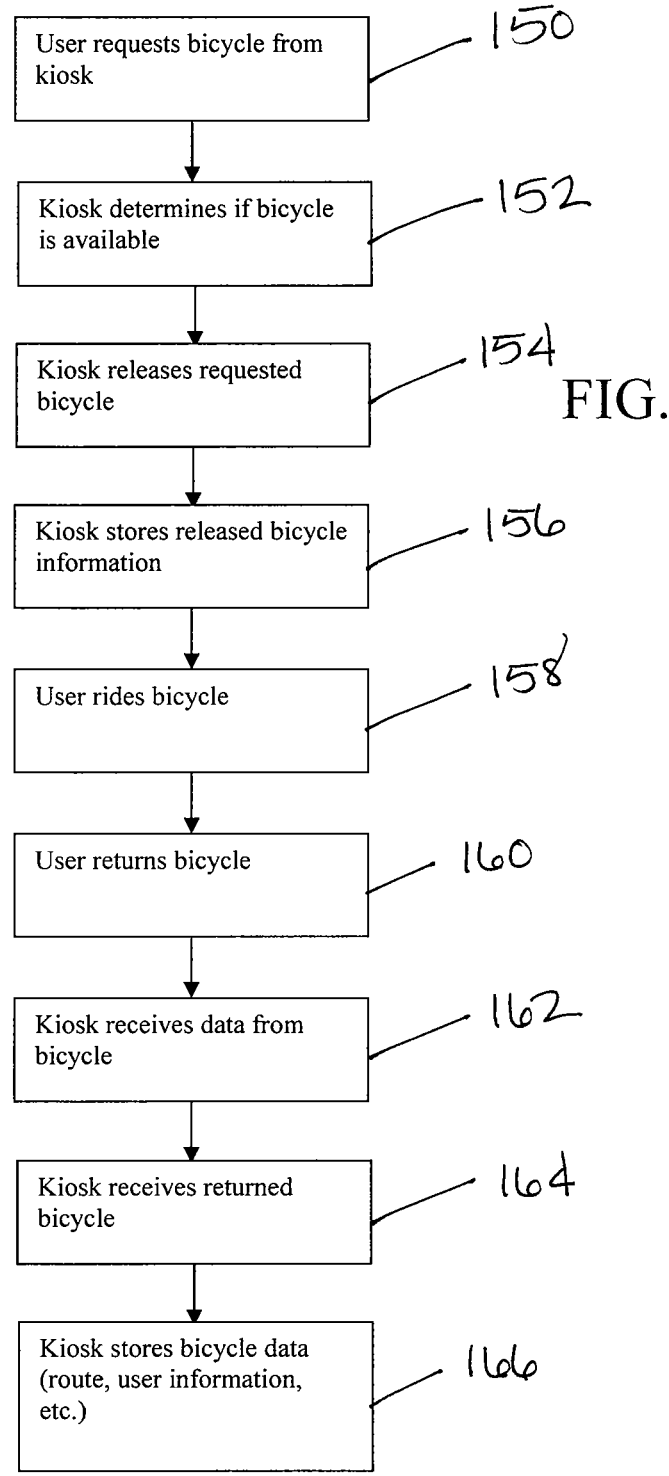
FIG. 11 is flowchart of a method of tracking one or more bicycles at a bicycle rental kiosk.

Referring now additionally to FIG. 11, a flow chart is provided illustrating a method of operation. In operation, when a particular user wishes to rent a bicycle 10 from one of the parking racks 68 on the system 12, he or she may do so by supplying payment in the form of a credit card or other identification previously discussed such as a membership card or the like at the user authorization element 78 in a first step 150. The system 12 may be configured so that the user may select which of the bicycles 10 he or she wishes to rent via, for example, the display element 76 or may simply choose one of the available bicycles 10 located at the parking rack 68 automatically. Moreover, the system 12 is configured to determine whether a bicycle 10 is available for rental in a second step 152. If a bicycle 10 is unavailable for rental, the system 12 may be configured to provide the user with information regarding where a bicycle 10 may be available for rental, e.g., at another kiosk 64 in the area.

Once rental of the bicycle 10 has been authorized at the kiosk 64, the kiosk electronically communicates with one of the parking spaces 70 of the parking rack 68 to unlock one of the bicycles 10 via the locking arrangement 74 in a third step 154. Once the bicycle 10 is unlocked from the parking rack 68, the identification reader 69 transmits a signal to the identification element 15 on the bicycle 10 and the identification element 15 provides a signal back to the identification reader 69 that identifies the particular bicycle 10 that has been rented in a fourth step 156. This information is then transmitted to the kiosk computer 66 and subsequently transmitted to the enterprise server 90 so that the enterprise server 90 may be notified of the removal of the bicycle 10 for riding by the user. In this manner, the system 12 is able to correlate a given user with the particular bicycle that he or she has rented and a record of the renting of that bicycle 10 may be transmitted to a given user's profile.

The user then rides the bicycle 10 for whatever period of time desired in a fifth step 158. During the course of the ride, the GPS module 96 logs the user's trip data 101 as previously discussed for subsequent transmission to the kiosk 64 via the kiosk radio head 140.

Once the user has completed his or her ride, he or she may return the bicycle 10 to any of the kiosks 64 in the system 12 in a sixth step 160. That is, the user may return the bicycle 10 to the originating parking rack 68 or may return it to another parking rack 68 that is part of the system 12.

Now additionally referring to FIG. 9, when the bicycle 10 is returned to the kiosk 64, it is configured to wirelessly transmit the collected trip data 101 via the communication module 98 to the kiosk radio head 140 in a seventh step 162. In a preferred embodiment, the kiosk radio head 140 and communication module 98 are configured to be operative to communicate the trip data 101 in a range of between approximately 10-30 meters line of sight from one another using an antenna 144 of the kiosk radio head. The antenna 144 may be a dipole antenna. The rate of data exchange may be configured so that the trip data 101 transmitted by the communication module 98 to the kiosk radio head 140 may be done in less than four seconds for an eight-hour ride. Moreover, the kiosk radio head 140 may be configured for frequency hopping to avoid interference. More particularly, if the kiosk radio head 140 experiences interference, the kiosk radio head 140 may be configured to switch channels and then resume data acquisition without loss of trip data 101. In one preferred embodiment, the kiosk radio head 140 may be able to pause or cancel a particular data acquisition if required, for example, to transmit a higher priority message to another bicycle computer 14.

To complete the rental of the bicycle and return the bicycle to the system 12, the user simply locks the bicycle 10 to the parking rack 68 via the locking arrangement 74 in an eight step 164. The locking arrangement 74 may be configured such that when a user places the bicycle 10 appropriately within the parking rack 68, the bicycle 10 is automatically locked via the locking arrangement 74. Using a similar process as previously described for identifying the bicycle 10 being removed, the system 12 is configured to identify the bicycle 10 being returned via the identification element 15 and identification reader 69. Once the bicycle 10 is identified, the identification reader 69 relays the information to the kiosk computer 66, which then stores a record indicating return of the bicycle and transmits the record to the enterprise server 90. Accordingly, the system 12 is able to determine which user has returned his or her bicycle 10 by matching the bicycle identification with the user who rented that bicycle 10.

Once the trip data 101 is received from the bicycle computer 14, the trip data 101 may then be transmitted via the router 142 to the kiosk computer 66 for further processing. The kiosk radio head 140 then transmits the trip data 101 to the enterprise server 90 via the router 142 as previously discussed in a ninth step 166.

Once the trip data 101 is received by the enterprise server 90, the trip data 101 is associated with the specific user's individual profile. The trip data 101 is then aggregated with his or her previous ride statistics. Further, the trip data 101 is then provided to the user in the form of a ride map 146 (FIG. 10).

Figure 10:
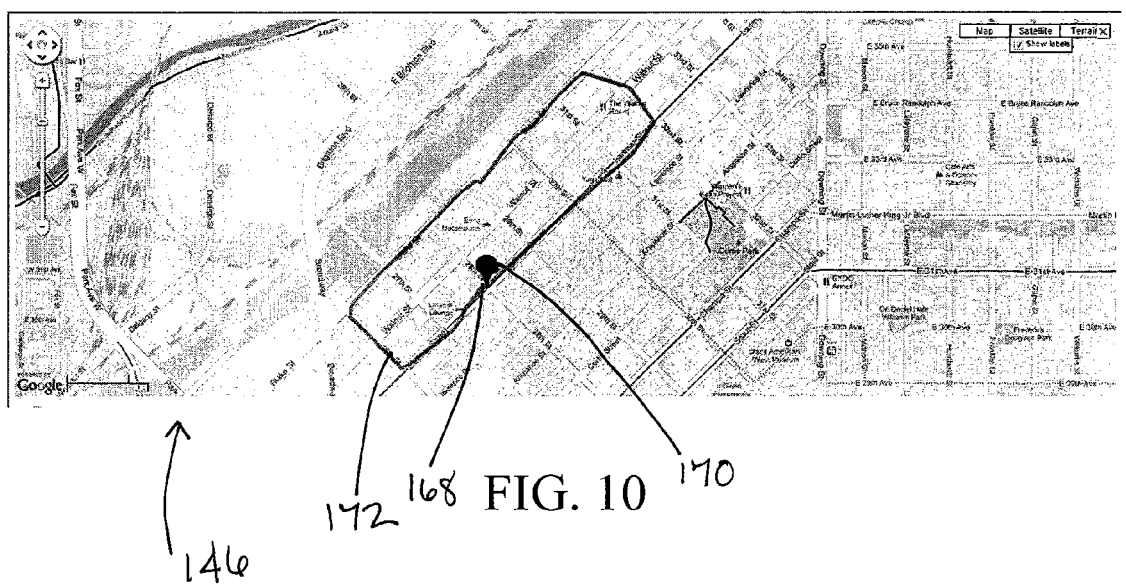
FIG. 10 is an exemplary illustration of a ride map according to the bicycle tracking system of the present invention.

Referring now to FIG. 10, an exemplary ride map 146 is illustrated. The ride map 146 may be shown as a satellite image or rendering of the area immediately surrounding the route taken by the user. The ride map 146 may identify a starting location 168 and ending location 170, which may be the same location if the user begins his or her ride at the same kiosk 64 as the one to which it the bicycle 10 is returned. The ride map 146 may further include a graphical representation of the route take by the user shown as route identification 172. The ride map 146 may include additional features as may be desired and may be viewed in a number of alternative formats.

The ride map 146 may be transmitted to the user via electronic means such as e-mail to a predefined user e-mail address so that the user may subsequently review or share the ride map 146. Further, the ride map 146 may be automatically transmitted to a social networking account associated with the given user, for example, Facebook® or Twitter®. Thus, the user's ride map 146 may be automatically shared with his or her friends via the user's various social networking accounts. Understandably, the system 12 may be configured so that the user may manually upload the ride map 146 to his or her social networking accounts.

One of the advantages of the system 12 of the invention is in providing the trip data 101 to the operators of the system 12 enables city planners and other interested parties able to determine how to better implement the bicycle sharing/rental system. For instance, the information may be used to judge where additional bicycle lanes may be desired based on determining where the bicycles are ridden with greatest frequency. In addition, it may assist operators in determining where to best locate the kiosks 66 and determine how existing bicycle paths are being utilized and whether changes are desired to improve usage.

The present invention has been described in terms of the preferred embodiment, and it is recognized that equivalents, alternatives, and modifications, aside from those expressly stated, are possible and within the scope of the appending claims.

What is claimed is:

1. A bicycle tracking system for a bicycle rental system comprising:
   at least one bicycle computer configured to be operably coupled to at least one bicycle, wherein the bicycle computer is configured to record and transmit trip data associated with riding of a rental of the at least one bicycle;
   a communication hub configured for operable communication with the at least one bicycle computer and configured to receive the trip data from the bicycle computer over a short-range wireless communication link only when the at least one bicycle is returned to a parking rack associated with the communication hub and transmit the trip data; and
   a server configured for operable communication with the communication hub and configured for reporting of trip data to at least one of a user and an operator;
   wherein:
   the trip data comprises at least three positions of the at least one bicycle; and
   the reporting of trip data comprises displaying a ride map showing the route taken during the rental of the at least one bicycle and plotting the route through the at least three positions.

2. The bicycle tracking system of claim 1, wherein the communication hub comprises a kiosk including a kiosk computer.

3. The bicycle tracking system of claim 2, wherein the kiosk is operably coupled to the parking rack configured to securely receive the at least one bicycle.

4. The bicycle tracking system of claim 1, wherein the bicycle computer includes a GPS device for recording the trip data at predetermined intervals.

5. The bicycle tracking system of claim 1, wherein the bicycle computer includes a RF transmitter for transmitting the trip data and the communication hub includes a RF receiver configured to receive the trip data from the bicycle computer.

6. The bicycle tracking system of claim 1, further comprising a unique identification element carried by the at least one bicycle and configured to communication with the communication hub to uniquely identify the at least one bicycle.

7. The bicycle tracking system of claim 6, wherein the unique identification element is a RF chip and wherein the communication hub includes a RF reader configured to transmit a signal to the RF chip and receive a signal from the RF chip to identify the at least one bicycle associated with the unique identification element.

8. The bicycle tracking system of claim 1, wherein the bicycle computer includes a GPS module, a communication module and a power module including a battery, wherein the power module is configured to determine a charge status of the battery and to charge the battery when a power level of the battery is below a predetermined threshold.

9. The bicycle tracking system of claim 1, wherein the server is configured to associate the trip data with a user profile.

10. The bicycle tracking system of claim 9, wherein the server is configured to aggregate the trip data with at least one preexisting trip data associated with the user profile.

11. The bicycle tracking system of claim 10, wherein the ride map is configured to be shared electronically.

12. A bicycle for use with a bicycle rental system, the bicycle comprising:
 a frame for rotatably supporting a pair of wheels;
 a handlebar assembly coupled to the frame for steering the bicycle;
 a pedal assembly coupled between the frame and the wheels for driving the wheels;
 a bicycle computer coupled to the frame configured to record trip data, including a location of the bicycle computer, at predetermined intervals, wherein the trip data comprises at least three plotting positions of the at least one bicycle captured during a route; and
 a communication device configured to transmit the trip data to a kiosk over a short-range wireless communication link only when the bicycle is returned to a parking rack associated with the bicycle.

13. The bicycle of claim 12, further comprising a power generating hub coupled to the frame and in operable communication to provide power to the bicycle computer.

14. The bicycle of claim 13, wherein the bicycle computer includes means for monitoring power consumption and wherein the power generating hub is configured to automatically provide power to the bicycle computer when power consumption exceeds a predetermined threshold.

15. A method of tracking bicycles of a bicycle rental system, the method comprising the steps of:
 identifying a bicycle rented to a user at a bicycle rental kiosk;
 releasing the bicycle to the user for riding;
 recording trip data at a GPS device at predetermined intervals during the riding of the bicycle by the user;
 transmitting the trip data to a communication hub at completion of the ride over a short-range wireless communication link only when the bicycle is returned to a parking rack associated with the communication hub; and
 providing the user with a route map showing the route taken during the rental of the bicycle;
 wherein:
  the trip data comprises at least three positions of the at least one bicycle; and
  the route map is generated using the trip data and plotted through the at least three positions.

16. The method of claim 15, further comprising the step of returning the bicycle to the kiosk.

17. The method of claim 15, further comprising the step of aggregating the trip data with at least one preexisting trip data record.

18. The method of claim 15, further comprising the step of transmitting the trip data to a server.

19. The method of claim 15, further comprising the step of charging a battery of the bicycle computer via a power generating hub coupled to the bicycle.

* * * * *